United States Patent [19]

Yoshisato et al.

[11] Patent Number: 4,535,435
[45] Date of Patent: Aug. 13, 1985

[54] CAPACITANCE DETECTOR FOR VIDEO DISK

[75] Inventors: Akiyuki Yoshisato; Kohta Iijima, both of Soma, Japan

[73] Assignee: Alps Electric Co., Ltd., Japan

[21] Appl. No.: 393,292

[22] Filed: Jun. 29, 1982

[30] Foreign Application Priority Data

Jun. 30, 1981 [JP] Japan .................. 56-97306

[51] Int. Cl.³ .................. G11B 9/00; G11B 3/00
[52] U.S. Cl. .................. 369/126; 369/129
[58] Field of Search .................. 369/126, 129, 151; 358/342

[56] References Cited

U.S. PATENT DOCUMENTS 4,080,625  3/1978  Kawamoto et al. .................. 369/126
4,150,395  4/1979  Pritchard .................. 360/36 X

FOREIGN PATENT DOCUMENTS 0124018  10/1978  Japan .................. 358/342

Primary Examiner—Aristotelis M. Psitos
Attorney, Agent, or Firm—Guy W. Shoup

[57] ABSTRACT

A capacitance detector for detecting a capacitance variation from a video disk and demodulating the capacitance variation into an electric signal, comprises a first block which includes a fixed oscillator, and a coupling loop comprised of a coupling coil and a coupling capacitor, the inductance of the fixed oscillator being inductively coupled with the coupling loop; and a second block which includes a disk stylus resonator having its resonance frequency varied by the capacitance variation of the video disk. A shield plate separates the first block from the second block and a coupling window is provided which inductively couples the coupling loop with the resonant inductance of the disk stylus resonator.

3 Claims, 4 Drawing Figures

CAPACITANCE DETECTOR FOR VIDEO DISK

BACKGROUND OF THE INVENTION

The present invention relates to a capacitance detector in a capacitance conversion type video disk player. More particularly, it relates to enhancements in the carrier-to-noise ratio (C/N ratio) and signal-to-noise ratio (S/N ratio) of a demodulated output signal.

The capacitance detector of the specified type needs to exhibit a high C/N ratio and a high S/N ratio for its output signal. Known capacitance detectors are unsatisfactory in this regard, and a stable and clear picture cannot always be reproduced from a video disk.

SUMMARY OF THE INVENTION

An object of the present invention is to provide a capacitance detector which produces a demodulated output signal of enhanced C/N ratio and S/N ratio.

In one aspect of performance of the present invention, a capacitance detector for detecting a capacitance variation from a video disk, on which the capacitance variation obtained by converting an FM-modulated video signal has been recorded, and for demodulating the detected capacitance variation into an electric signal is characterized by comprising a first block which is provided with a fixed oscillator, and a coupling loop consisting of a coupling coil and a coupling capacitor and in which an inductance of said fixed oscillator and said coupling loop are inductively coupled, a second block which is provided with a disk stylus resonator having its resonance frequency varied by the capacitance variation of the video disk, and the first and second blocks being on respective sides of a shield plate having a coupling window which inductively couples said coupling loop of said first block with a resonant inductance of said disk stylus resonator of said second block.

DETAILED DESCRIPTION OF THE INVENTION

Figure 1:
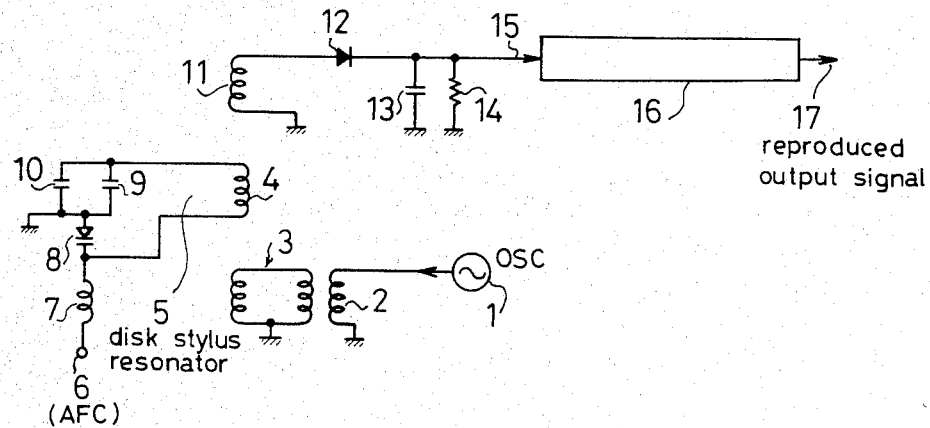
FIG. 1 is a circuit diagram showing the fundamental capacitance detector in a capacitance conversion type video disk player.

First of all, a capacitance detector (hereinbelow, termed "resonator device") in a capacitance conversion type video disk player will be described with reference to FIG. 1 illustrative of the fundamental circuit thereof. Numeral 1 designates a fixed oscillator of the UHF band, which delivers a signal of approximately 915 MHz. The signal is transmitted to a resonant inductance 4 by inductive coupling from a coupling coil 3 coupled inductively with an inductance 2. Numeral 5 indicates a disk stylus resonator which is an important part of the resonator device. Shown at numeral 8 is a variable-capacitance diode, which receives an AFC signal from a terminal 6 so as to adjust the resonance frequency of the resonator. A choke coil 7 functions for radio frequency isolation. Numeral 9 denotes a stray capacitance, and numeral 10 a capacitance recorded on a video disk. Usually, the stray capacitance 9 becomes constant at about 0.5 pF, while the capacitance 10 exhibits a capacitance variation in $10^{-4}$ pF unit. Numeral 11 represents a detecting coil which is coupled with the resonant inductance 4. A diode 12 serves for AM detection, and a capacitor 13 and a resistor 14 constitute a smoothing circuit for the detected signal. Shown at numeral 16 is an FM detector/amplifier.

Figure 2:
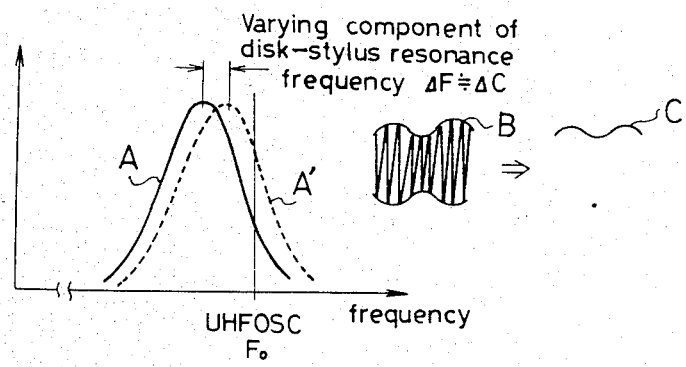
FIG. 2 is a diagram for explaining the capacitance detector shown in FIG. 1.

The operation of this circuit will now be described in detail with reference to FIG. 2.

The capacitance conversion type video disk player detects the capacitance of the disk, and forms an AM-modulated UHF signal proportional to the detected capacitance. Subsequently, AM-modulated signal is sent to a detector to remove a carrier and to produce a signal proportional to the detected capacitance. This produced signal corresponds to the capacitance variation on the video disk as obtained by FM-modulating a video signal and then converting the modulated signal into the capacitance variation. Therefore, when the produced signal is FM-detected, the original information recorded on the disk can be derived. An important part of the resonator device is the disk stylus resonator 5, which is furnished beforehand with a resonance characteristic A deviating from the UHF-band oscillation frequency $F_o$ of the fixed oscillator 1 as shown in FIG. 2. The oscillation frequency $F_o$ corresponds to a slope of the resonance characteristic A.

Since the varying component of the foregoing capacitance 10 recorded on the disk changes the resonance characteristic A in accordance with the recorded information, this characteristic becomes as indicated by a resonance characteristic A'. Accordingly, the intensity (amplitude) of the oscillation frequency signal $F_o$ transmitted from the coupling coil 3 as appears in the disk stylus resonator 5 changes, so that an amplitude-modulated signal flows through the resonant inductance 4. This AM-modulated signal is shown at B in FIG. 2. The AM-modulated signal B is transmitted to the detecting coil 11 which is coupled with the resonant inductance 4. Further, the AM-modulated signal is AM-detected by the diode 12 and the smoothing circuit composed of the capacitor 13 and the resistor 14, with the result that an output signal shown at C in FIG. 2 is obtained. Subsequently, the AM-detected signal is FM-detected by the FM detector/amplifier 16, so that a reproduced video signal is provided from a terminal 17.

The function of the AFC at this time is to control into a predetermined value the difference between the UHF oscillation frequency $F_o$ and the center value of the resonance characteristic A of the disk stylus resonator 5. Further, the AFC possesses the function of a kind of AGC, according to which, unless the detected level is proper, the frequency of the difference is changed and controlled within a range not distorting the reproduced signal. More specifically, when the reproduced level is low, the detection level is raised by making the difference frequency small. When the reproduced level is high, the converse measure may be taken.

As the performances of such resonator device, it is required that the carrier-to-noise ratio (C/N ratio) of the reproduced signal C at a terminal 15 be high and that the signal-to-noise ratio (S/N ratio) of the output signal at the terminal 17 be high. To these ends, it is thought to increase the Q factor of the disk stylus resonator 5 and to improve the C/N ratio of the UHF oscillation signal itself.

Figure 3:
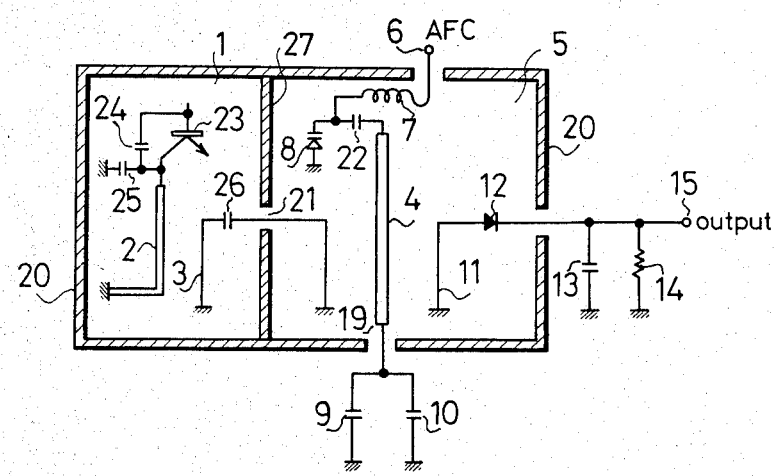
FIG. 3 is a circuit diagram showing a prior-art capacitance detector.

Now, a prior-art resonator device will be described with reference to FIG. 3 in which parts indicated by the same numerals as in FIG. 1 have the same functions.

Numeral 20 indicates a metal housing as an envelope chassis, in which the principal circuit parts are assembled. The envelope chassis 20 is divided into two, to construct the fixed oscillator 1 and the disk stylus resonator 5. The fixed oscillator 1 includes therein a transistor 23, a feedback capacitor 24, a capacitor 25 and the inductance 2, and oscillates at the frequency of 915 MHz mentioned before. The disk stylus resonator 5 has the AFC voltage applied to the terminal 6 so as to control the capacitance of the variable-capacitance diode 8 to an appropriate value. The resonance characteristic of the resonator 5 is determined by the variable-capacitance diode 8, a capacitor 22, the resonant inductance 4, the capacitance 10 recorded on the disk, and the stray capacitance 9.

The oscillation frequency signal induced in the inductance 2 of the fixed oscillator 1 is supplied to the resonant inductance 4 through the coupling coil 3 which penetrates through a hole 21 provided in a shield plate 27. On the other hand, the stray capacitance 9 and the varying capacitance 10 detected from the disk are connected to one end 19 of the resonant inductance 4. The resonance frequency of the disk stylus resonator 5 changed as stated before, and the signal thus AM-modulated as developed in the coupling coil 11 is AM-detected by the diode 12.

In order to enhance the C/N and S/N ratios, the prior-art circuit sometimes takes the measure of incorporating a coupling capacitor 26 in series with the coupling coil 3 so as to set their resonance frequency an a value close to the oscillation frequency of the fixed oscillator 1. In this case, the coupling becomes intense at the resonance frequency of the coupling coil 3 and the coupling capacitor 26, so that the inductance 2, coupling coil 3 and resonant inductance 4 can be kept apart from each other. At the resonance frequency of the disk stylus resonator 5, therefore, a loose coupling is established, and an increase in the Q factor of the disk stylus resonator 5 is achieved. As a result, the C/N and S/N ratios are enhanced.

The prior-art circuit, however, does not meet the desired C/N ratio value of −60 dB and the desired S/N ratio value of −40 dB. Experiments have revealed that the circuit including only the coupling coil 3 without the provision of the capacitor 26 affords a C/N ratio of −55 dB and an S/N ratio of −36 dB, and that the circuit provided with the capacitor 26 in series with the coupling coil 3 affords a C/N ratio of −58 dB and an S/N ratio of −39 dB. Such values are not satisfactory, and have led to the disadvantage that a stable picture cannot always be reproduced.

Figure 4:
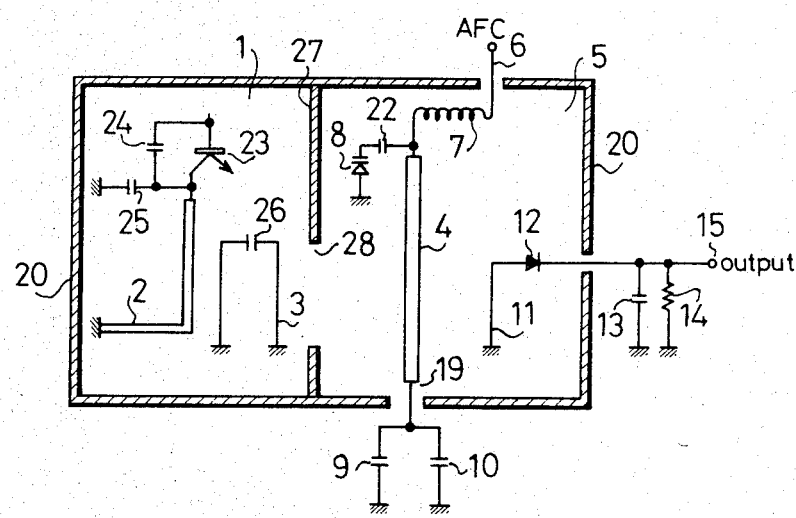
FIG. 4 is a circuit diagram showing an embodiment of the present invention.

The present invention achieves enhancements in the C/N and S/N ratios with a simple structure. An embodiment of the invention is shown in FIG. 4, and its parts different from the prior-art circuit will be described in detail.

Structurally, the embodiment is characterized in that the coupling loop consisting of the coupling coil 3 and the coupling capacitor 26 is shifted into the compartment for the fixed oscillator 1 and that a coupling window 28 is provided in the shield plate 27, to electromagnetically couple the coupling loop and the disk stylus resonator 5.

Electrically, the natural oscillation frequency to be generated by the inductance 2, capacitor 25, feedback capacitor 24 and transistor 23 is set at 855-875 MHz being 40-60 MHz lower than 915 MHz, the resonance frequency of the coupling coil 3 and coupling capacitor 26 is set at a point being 1-2 MHz lower than 915 MHz, and the oscillation frequency is determined to 915 MHz by the inductive coupling between the inductance 2 and the coupling coil 3.

First, the oscillation circuit will be described. It is intended to obtain an oscillation signal of good C/N characteristic by oscillation with a resonance circuit of high Q. On the resonance circuit side to which the transistor 23 is added and which performs the natural oscillation, the transistor 23 itself acts as a load, and it is difficult to attain an oscillation of high Q. In contrast, that cavity on the oscillator side in which the coupling loop consisting of the coupling coil 3 and the coupling capacitor 26 is placed forms a circuit of high Q by itself. When the coupling loop and the inductance 2 are inductively coupled and the oscillation frequency is predominantly determined by the resonance frequency of the coupling loop, the oscillator side forms a resonance circuit of high Q and the oscillation of high C/N ratio is permitted.

Next, the electromagnetic wave generated by the coupling coil 3 is coupled to the resonant inductance 4 through the coupling window 28, the oscillation signal from the fixed oscillator 1 is AM-modulated in the disk stylus resonator 5, the AM-modulated signal is derived by the detecting coil 11 and then detected by the diode 12, capacitor 13 and resistor 14, and the detected signal is delivered from the terminal 15.

When an example of the embodiment was operated and the C/N and S/N ratios were actually measured, a C/N ratio value of −64 dB and an S/N ratio value of −54 dB were obtained. Both the C/N and S/N ratios have been considerably improved, and have exceeded the desired values sufficiently.

This favorable result will be partly owed to the fact that, since the coupling loop affects the oscillation frequency intensely, the oscillation frequency signal flowing through the coupling loop increases to permit the resonant inductance 4 to couple with the fixed oscillator 1 more loosely, so the rise of the Q factor of the disk stylus resonator 5 is effective.

As set forth above, according to the present invention, merely by making simple alterations, the C/N and S/N ratios forming the essential features of a resonator device can be enhanced, and a picture to be reproduced from a video disk becomes stable and clear. This is greatly effective.

We claim:

1. In a capacitance detector for detecting a capacitance variation recorded on a video disk by converting an FM-modulated video signal, and for demodulating the detected capacitance variation into an electric signal; a capacitance detector for a video disk comprising:

a first block provided with a fixed oscillator and a coupling loop comprising a coupling coil and a coupling capacitor, the inductance of said fixed oscillator and said coupling loop being inductively coupled, a second block provided with a disk stylus resonator having its resonance frequency varied by the capacitance variation of the video disk, and means including a shield plate separating the components of said first block from the components of said second block and having a coupling window for inductively coupling said coupling loop of said first block with a resonant inductance of said disk stylus resonator of said second block through said coupling window.

2. A capacitance detector for a video disk as defined in claim 1, wherein a single chassis is divided into two parts by said shield plate provided with said coupling window, and one part is used as said first block, while the other part as said second block.

3. A capacitance detector for a video disk as defined in claim 1, wherein an oscillation frequency of said fixed oscillator is set at a frequency 40–60 MHz lower than a desired frequency, a resonance frequency of said coupling loop is set at a frequency 1–2 MHz lower than said desired frequency, and said fixed oscillator is oscillated at said desired frequency by inductively coupling said fixed oscillator and said coupling loop.

* * * * *